United States Patent
Ye et al.

(10) Patent No.: US 10,636,048 B2
(45) Date of Patent: Apr. 28, 2020

(54) NAME-BASED CLASSIFICATION OF ELECTRONIC ACCOUNT USERS

(71) Applicant: Oath Inc., New York, NY (US)

(72) Inventors: Junting Ye, Forest Hills, NY (US); Yifan Hu, Mountain Lakes, NJ (US); Baris Coskun, Glen Rock, NJ (US); Meizhu Liu, Livingston, NJ (US); Steven Skiena, Setauket, NY (US)

(73) Assignee: Oath Inc., New York, NY (US)

( * ) Notice: Subject to any disclaimer, the term of this patent is extended or adjusted under 35 U.S.C. 154(b) by 565 days.

(21) Appl. No.: 15/418,376

(22) Filed: Jan. 27, 2017

(65) Prior Publication Data
US 2018/0218382 A1    Aug. 2, 2018

(51) Int. Cl.
  G06F 3/048    (2013.01)
  G06N 20/00    (2019.01)
  G06Q 30/02    (2012.01)
  H04L 29/06    (2006.01)

(52) U.S. Cl.
  CPC ........ G06Q 30/0204 (2013.01); G06N 20/00 (2019.01); *G06Q 30/0267* (2013.01); *H04L 63/083* (2013.01)

(58) Field of Classification Search
None
See application file for complete search history.

(56) References Cited

U.S. PATENT DOCUMENTS

| | | | | |
|---|---|---|---|---|
| 2007/0162308 A1* | 7/2007 | Peters | ........... | G06F 19/328 705/2 |
| 2010/0017487 A1* | 1/2010 | Patinkin | ........... | G06Q 10/107 709/206 |
| 2011/0296524 A1* | 12/2011 | Hines | ........... | G06F 21/552 726/22 |
| 2013/0133048 A1* | 5/2013 | Wyn-Harris | ........ | H04L 63/0861 726/5 |
| 2014/0297712 A1* | 10/2014 | Karam | ........... | H04L 51/32 709/202 |
| 2015/0156172 A1* | 6/2015 | Nandi | ........... | G06Q 30/0282 713/153 |
| 2015/0213372 A1* | 7/2015 | Shah | ........... | H04L 51/32 706/12 |
| 2016/0171539 A1* | 6/2016 | Ganduri | ........... | G06Q 30/0255 705/14.53 |
| 2016/0210427 A1* | 7/2016 | Mynhier | ........... | G16H 50/20 |

* cited by examiner

Primary Examiner — Thomas L Mansfield
(74) Attorney, Agent, or Firm — Cooper Legal Group, LLC

(57) ABSTRACT

Communication accounts may contain information such as account holder names, contact lists, and communication logs. Such information may be processed for generating features that may be used as corpus for a machine learning algorithm for developing classifiers of names. Specifically, names and contact names of the accounts may be arranged in to a document according to the manner in which account holders communicate with the contacts. The document may be used for generating word embedding of the names. Names prelabeled with ethnicity together with their word embedding may be used as training data for developing ethnicity classifiers based on machine learning algorithms.

20 Claims, 6 Drawing Sheets

```
┌─────────────────────────────┐  ┌─────────────────────────────┐  ┌─────────────────────────────┐
│ Communication Account 1:    │  │ Communication Account 2:    │  │ Communication Account N:    │
│                      502    │  │                      504    │  │                      506    │
│ Account Holder Name:        │  │ Account Holder Name:        │  │ Account Holder Name:        │
│     Abc, Efg                │  │     Hij, Klm                │••│     Nop, Qrs                │
│                             │  │                             │  │                             │
│ Contact Names:              │  │ Contact Names:              │  │ Contact Names:              │
│     AAA, BBB  (15)          │  │     III, JJJ  (1)           │  │     QQQ, RRR  (8)           │
│     CCC, DDD  (1)           │  │     KKK, LLL  (5)           │  │     SSS, TTT  (5)           │
│     EEE, FFF  (7)           │  │     MMM, NNN  (2)           │  │     UUU, VVV  (1)           │
│     GGG, HHH  (10)          │  │     OOO, PPP  (10)          │  │     WWW, XXX  (9)           │
└─────────────────────────────┘  └─────────────────────────────┘  └─────────────────────────────┘
```

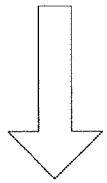

```
┌──────────────────────────────────────────────────────────────────────────┐
│ Corpus Document for Learning Word Embedding:              508            │
│                                                                          │
│   Efg1 abc-1 BBB1 AAA-1 HHH1 GGG-1 FFF1 EEE-1 DDD1 CCC-1                 │
│   Qrs1 Nop-1 XXX1 WWW-1 RRR1 QQQ-1 TTT1 SSS-1 VVV1 UUU-1                 │
│   Klm1 Hij-1 PPP1 OOO-1 LLL1 KKK-1 NNN1 MMM-1 JJJ1 III-1                 │
└──────────────────────────────────────────────────────────────────────────┘
```

```
Obtain features of the each labeled name based on word embedding
of the name parts of the each labeled name and the word embedding
of the name parts in the contact list of the communication account
corresponding to the each labeled name
                                                              602
```

```
Use the labeling ethnicity as classification for each labeled name and
the calculated features of each labeled name to develop an ethnicity
classifier model based on a machine learning algorithm
                                                              604
```

Obtain features of an unlabeled name      606

```
Classify at least one unlabeled name into one of the ethnicity groups
using the developed ethnicity classifier model and the calculated
features of the unlabeled name
                                                              608
```

NAME-BASED CLASSIFICATION OF ELECTRONIC ACCOUNT USERS

BACKGROUND

Lists of communication targets contained in electronic communication accounts, such as contact lists in email accounts, and manners in which contacts are used by communication account holders contain valuable information that may be analyzed and used to derive various properties and characteristics of the account holders and their contacts. In particular, the account holders and their contacts may be classified into one of a predefined set of classes with respect to a certain characteristic. Effectiveness of targeted information dissemination, such as targeted advertisement, may be improved by such classification.

BRIEF DESCRIPTION OF THE DRAWINGS

The system and method described below may be better understood with reference to the following drawings and description of non-limiting and non-exhaustive embodiments. The components in the drawings are not necessarily to scale. Emphasis instead is placed upon illustrating the principles of the disclosure. In the drawings, like referenced numerals designate corresponding parts throughout the different views.

FIG. 5 shows an example of a learning document generated from communication accounts for deriving word embedding for names; and FIG. 6 shows a flow chart for establishing ethnicity classifiers based machine learning of training data containing embedding features of names and ethnicity labels, and for using the established ethnicity classifiers to classify unlabeled names into most probably ethnicities.

DETAILED DESCRIPTION

Figure 1:
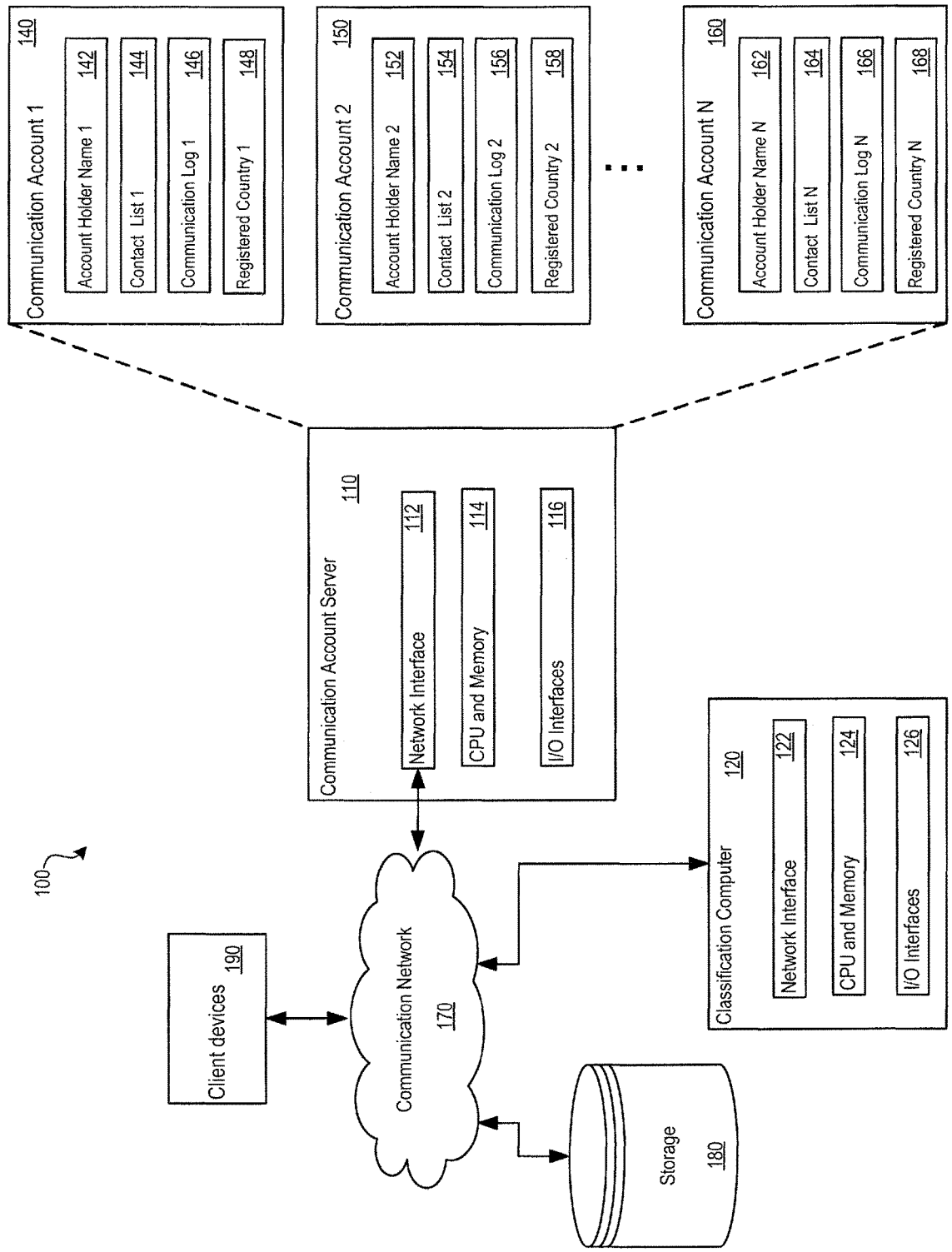
FIG. 1 shows a computer network system supporting user communication accounts.

The present disclosure describes methods and apparatus for classifying names into a predefined set of classifications (such as ethnicity classifications) based on applying machine learning algorithms to information derived from electronic communication accounts (such as email accounts). In summary, classification of a selected group of account holder names may be determined; contact lists of the selected group of account holders and manners in which contacts are used by the selected group of account holders for communication may be analyzed to generate features whose correlation with names may be identified using machine learning algorithms; and the identified correlation may be used to classify names with unknown classification. Effectiveness of automated and targeted information dissemination, such as targeted advertisement, may be improved by such classification.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se).

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

FIG. 1 shows a computer network system 100 including multiple client devices 190 in communication with a communication account server 110 for accessing a plurality of communication accounts 140, 150, and 160 via a communication network 170. The computer network system 100 may further include a computer 120 in communication with the communication account server 110 via the communication network 170 for developing classification models. The system 100 may additionally include storage 180. Hereinafter, a communication account may be interchangeably referred to as an account, and the communication account server 110 may be interchangeably referred to as the server. Each account may be associated with an account holder. The server may maintain accounts 140, 150, or 160 and provide corresponding account holders access to the accounts from client devices 190.

An account holder of an account may register the account under a name of the account holder. For example, accounts 140, 150, and 160 may be registered under account holder names 142, 152, and 162, respectively. Each account may further include other account information. For example, accounts 140, 150, 160 may include geographical information, such as countries of registration 148, 158, and 168 for the account holders. The server 110 may further maintain a list of communication targets or a contact list (referred to as "contact list" hereinafter) for each account. For example, accounts 140, 150, and 160 may include contact lists 144, 154, and 164, respectively. Each contact list may include information about contacts of the corresponding account holder. The information for contacts, for example, may include and is not limited to names of the contacts. An account holder may use the account to communicate with others and the server 110 may maintain a communication log for the account holder. Thus, each account 140, 150, or 160 may further include communication logs 146, 156, and 166, respectively.

A client device 190 may, for example, be a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the foregoing devices, or the like. A client device may vary in terms of capabilities or features. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled user device or account holder device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example. A client device 190 may include or may execute a variety of operating systems, including a personal computer operating system, such as a Windows, iOS or Linux, or a mobile operating system, such as iOS, Android, or Windows Mobile, or the like.

A client device 190 may include or may execute a variety of possible applications, such as a client software application enabling communication with the server 110 for accessing a communication account. Access of a communication account on the server 110 via the client software may be gate-kept using login credentials such as username and password. As such, each of multiple different account holders may access their accounts from a single client device by simply using the client software and logging in with appropriate account credential. Further, an account holder may own multiple client devices 190 and may access the corresponding account on the server 110 via any one of the multiple client devices 190.

The server 110 may be a computing device capable of sending or receiving signals, processing or storing signals, such as in memory as physical memory states. Thus, devices capable of operating as a server 110 may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory 114, one or more network interface 112 and I/O interface 116. A server may further include one or more local mass storage devices. Alternatively, a server may communicate with network storage 180 via the communication network 170. The server 110 may be installed with one or more operating systems, such as Windows Server, Mac OS X, Unix, Linux, FreeBSD, or the like. The server 110 may be a single server or a cluster of servers. The cluster of server may be centralized or distributed. Similarly, network storage 180 may comprise a single or multiple storage devices that may be centralized or distributed.

Account holder names 142, 152, and 162, as well as names included in contact lists 144, 154, and 164 may comprises various name parts. For example, a name may comprise a first name and a last name (or surname). A name may further comprise a middle name. In the context of classifying names, such as will be disclosed in further detail below, because a same name part may possibly appear as a first name as well as a last name, name parts are considered the basic unit in the development of classification models below.

An account can be any type of communication account including but not limited to an email account, a social network account such as a Facebook account and a Twitter™ account, a photo/video-sharing account, a chat account, a professional network account such as a LinkedIn™ account, and a communication account such as cellular account. Communication accounts 140, 150, and 160 may not need to be the same type of accounts. They may be a mix of various types of accounts. For example, account 140 may be an email account, while accounts 150 and 160 may be Facebook accounts. Correspondingly, the server 110 may be a single or cluster of servers that are capable of supporting the various types of accounts 140, 150, and 160. For simplicity of illustration, accounts 140, 150, and 160 are taken as email accounts and correspondingly, the server 110 is taken as an email server.

The combination of name, contact list of an account holder, and how the contacts in the contact list are used by the account holder (as recorded in, for example, the communication log 146, 156, or 166) contains valuable information that may be used to predict certain characteristics of the account holder. Such information may be processed for developing classifier models for predicting behaviors and characteristics of account holders using machine learning algorithms. These behaviors or characteristic classification may be used for individualized information dissemination, such as targeted advertisement. The classification computer 120 may be used for developing these classifier models. The computer 120 may include one or more central processing units (or processors) and memory 124, one or more network interface 122 and I/O interface 126. The central processing units or processors are in communication with the memory and configured to execute instructions stored in the memory. The classification computer 120 may obtain account information from the server 110 via communication network 170. Alternatively, the function of the classification computer 120 may be included in the server 110. In that case, a separate classification computer 120 may not be necessary.

Without losing generality or imposing any limitation on the scope of the current disclosure, the implementations below focus on establishing a model for classifying names into a predefined set of ethnicities based on email accounts. These implementations are based on a statistical observation that an email account holder tends to communicate with contacts having similar ethnic background as his/hers in manners different from other contacts. For example, an account holder may communicate with contacts having his/her ethnicity more frequently. For another example, an account holder may send longer communication messages to, and/or be more inclined to share photo/video with contacts having ethnic background similar to his/hers.

The ethnicity classifier disclosed below follows a general machine learning approach of first establishing a training data set containing account holder names each labeled with an ethnicity classification and each associated with a set of features developed from the a corresponding account. The ethnicity labels and features of the training data may then be used as input to a machine learning algorithm such as logistic regression or random forest regression. The machine learning algorithm regressively learns correlations between the features and the ethnicity label in the training data and establishes a model that may be used to classify an unlabeled name into a most probable ethnicity classification.

Figure 2:
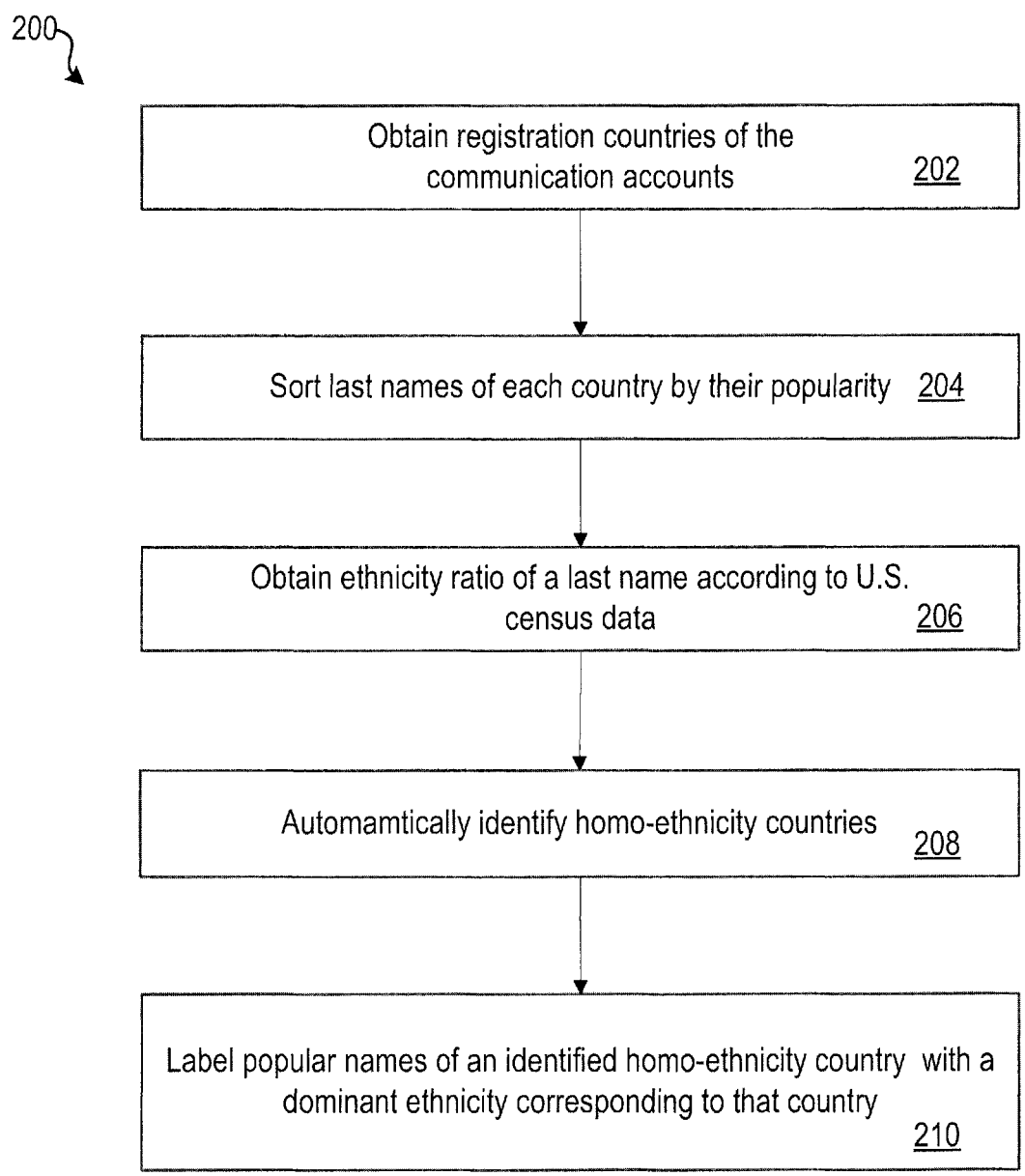
FIG. 2 is a flow chart for automatically labeling communication account names with ethnicity.

FIG. 2 illustrates an exemplary flow chart 200 for automatically selecting accounts as a training account set and automatically labeling the corresponding account holder names with ethnicities. There are many reasons why automatic rather than manual labeling of training data set is desired in the context of constructing a large scale training data set with ethnicity labels. Suppose a set of 1 million names are to be labeled. If this were to be done manually, it may take 30 seconds for annotators to go through one email profile and make a decision on an appropriate ethnicity label. Then labeling 1 million names requires 8333 working hours. In addition, email users come from all kinds of ethnic backgrounds and are in contact with people with different ethnicities and thus individual annotators may easily mislabel and create an unacceptable level of noise in the training data set. Further, from privacy standpoint, manual labeling may expose personal information of email account holders and contacts at higher risk.

In block 202 of FIG. 2, country of registration of each email account is obtained. Registration country information may have been collected and recorded for the account when a user created an account with the server 110. Such information may have been explicitly input into an online registration form (e.g., as part of an address) or may have been inferred from location of registration automatically detected at the time of registration via, for example, an IP address of the device used for registration.

Figure 3:
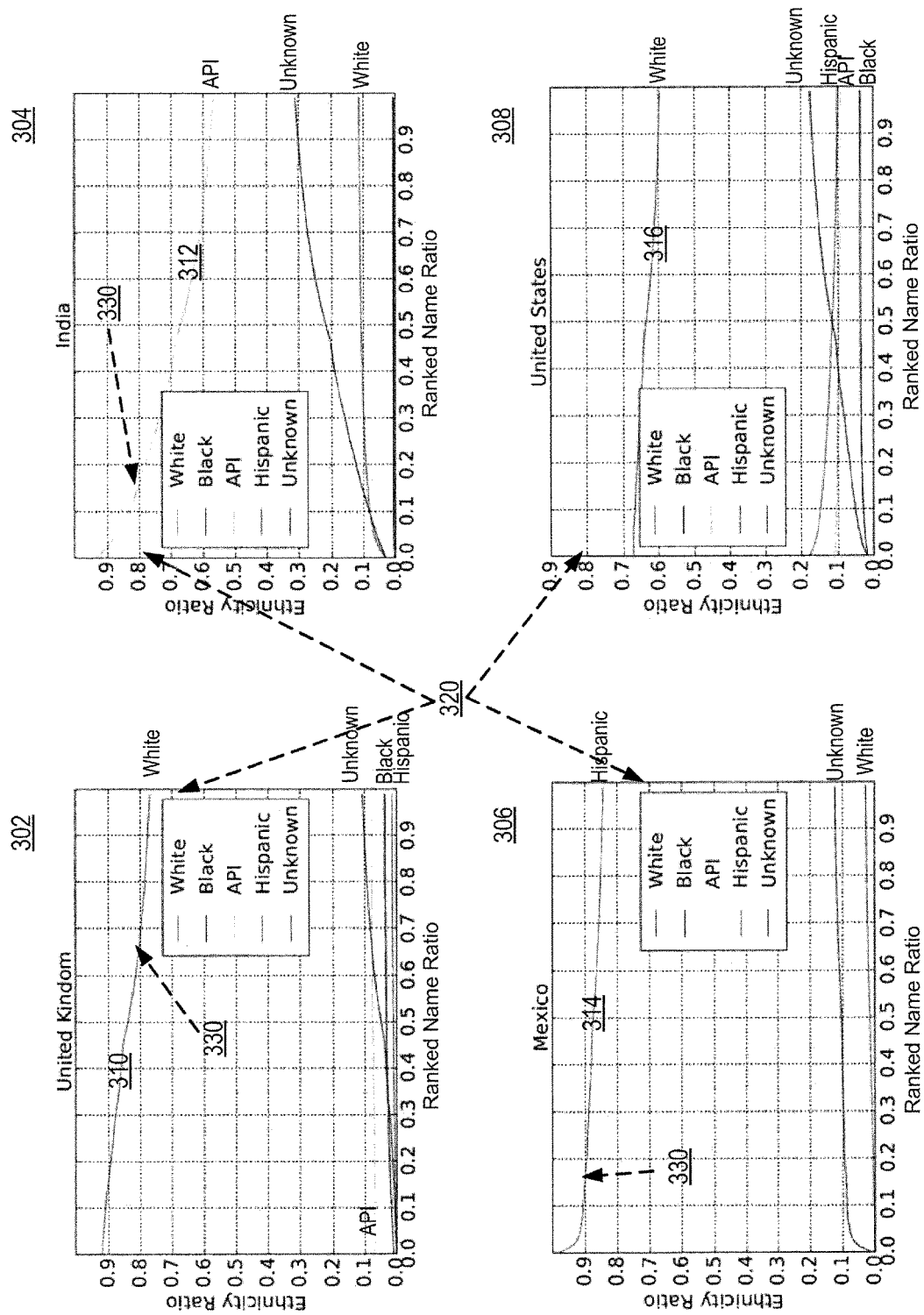
FIG. 3 illustrates exemplary relationship between ethnicity ratio based on U.S. census date and ranked name ratio for communication accounts registered from various countries.

In block 204, last names within each country are sorted by their popularity (such as number of occurrences). The popularity of a last name may be represented by a ranked name ratio of the last name in terms of popularity, between 0 and 1, with 0 representing the highest popularity and 1 representing the lowest popularity. In block 206, ethnic compositions or ethnicity ratios of last names may be obtained by looking up the U.S. census data. Ranked name ratio-ethnicity ratio curves for each country may be constructed. Examples are shown in 302, 304, 306, and 308 of FIG. 3 for names registered in United Kingdom, India, Mexico, and United States, respectively. Each curve in FIG. 3 is associated with an ethnicity and a country. A point (x, y) on a curve for an ethnicity in a particular country represents that a last name registered in that country and having a ranked name ratio of x corresponds to a composition ratio of y for that ethnicity for that last name according to the U.S. census data. Each country may have a dominant ethnicity corresponding to curves such as 310, 312, 314, and 316.

Returning to FIG. 2 and in block 208, homo-ethnicity countries are identified. In this disclosure, a homo-ethnicity country refers to a country where the vast majority of its population had the same or similar ethnicity. Since most people from homo-ethnicity countries have the same ethnicity, it may be of high accuracy to label popular account holder names registered from these countries with the corresponding dominant ethnicity. Homo-ethnicity countries may be identified in various ways. For example, a predefined ethnicity ratio threshold 320 in FIG. 3 may be used. For example, the ethnicity ratio threshold may be 0.8 or may be other values. Specifically, if at least one point on a dominant curve in FIG. 3 has an ethnicity ratio (y value) larger than the predefined ethnicity ratio threshold, the corresponding country may be considered homo-ethnic. For example, in FIG. 3, United Kingdom, India and Mexico may be considered homo-ethnicity countries because each of these countries has a dominant ethnicity ratio with at least one point higher than the predefined ethnicity ratio threshold of 0.8 according to the U.S. census data. In contrast, the United States, as shown by the curves in 308 of FIG. 3, does not have any ethnicity ratio higher than 0.8 at any point. The United States may thus be considered a country of hetero-ethnicity.

Returning to FIG. 2, after identifying homo-ethnicity countries, in block 210, last names registered in a homo-ethnicity country that are more popular than the last name corresponding to the point 330 on a dominant ethnicity curve crossing the ethnicity ratio threshold 320 in FIG. 3 may be labeled with that dominant ethnicity. In other words, names having last names corresponding to ranked name ratios to the left side of points 330 may be labeled with the dominant ethnicity. In the example of FIG. 3, names registered in United Kingdom having last names that are more popular than a ranked name ratio of about 0.7 (ranked name ratio of 0 to 0.7) may be labeled as White. Similarly, names registered in India having last names that are more popular than a ranked name ratio of about 0.16 may be labeled as API, and names registered in Mexico having last names that are more popular than a ranked name ratio of about 0.17 may be labeled as Hispanic. The labeled names may include those having last names that are popular but do not appear in U.S. census data and thus were not included in the curves of FIG. 3.

As an example implementation, Yahoo! email user information may be collected by Xobni. Using the U.S. census date of 2000, an ethnicity ratio threshold of 0.8, and a predefined ethnicity set of White, API and Hispanics, 1,262,586 names of Yahoo! email accounts were automatically labeled based on the implementation above, as shown in Table I.

TABLE I

| Total# | White# | API# | Hispanic# |
|---|---|---|---|
| 1,262,586 | 576,391 | 479,174 | 170,163 |

Figure 4:
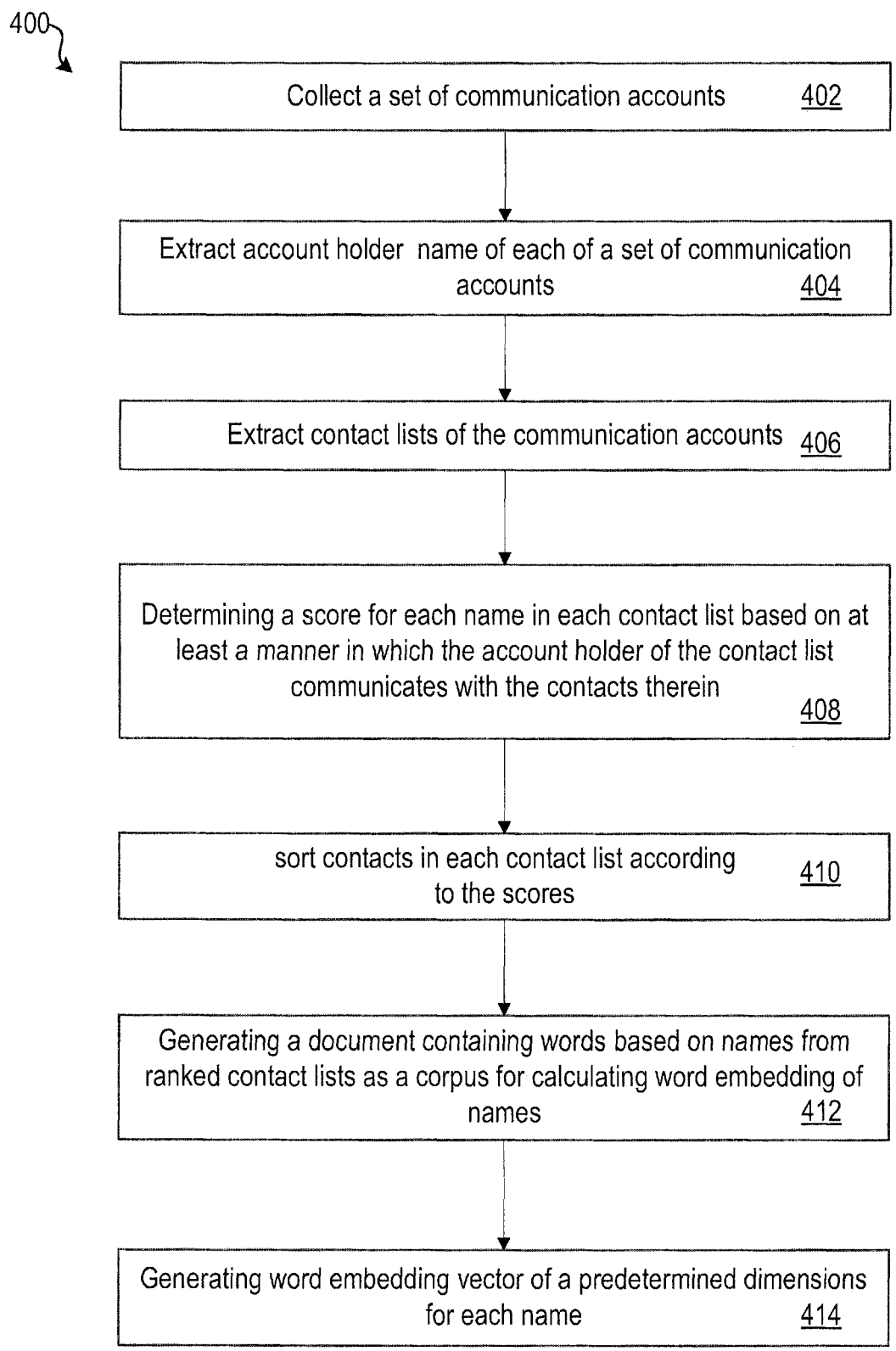
FIG. 4 shows a flow chart for processing account information of multiple communication accounts and generating word embedding of names extracted from the communication accounts.

FIG. 4 illustrates an exemplary flow chart 400 for generating features of names based on information of the communication accounts for developing ethnic classifiers. Because the manners in which users of electronic accounts communicate with contacts carry information about the users' various characteristics, e.g., ethnicity, classification of names into the various characteristics using machine learning algorithms may be based on a corpus of training data containing features generated from contact lists and communication log of the communication accounts. Specifically, account information may be processed to extract the manners in which the users of the accounts communicate into features that may be learned using machine learning algorithms. In FIG. 4, based on the statistical observation that a user is more likely to communicate frequently with a contact of his/her ethnicity (e.g., to send email to his/her contacts), features for developing an ethnicity classifier may be developed by producing a learning document containing account holders names and their frequent contact names in close proximity and then use a word embedding technique to extract word embedding for each name using the learning document as a corpus. Distance between resulting embedding vectors of any two names represents their dissimilarity. In the example of FIG. 3, the ordering of the names into the learning document is based on communication frequency with contacts, which closely relates to the ethnicity similarity of names. A small distance between two resulting embedding (or embedding vectors) may thus signify that the names associated with these two embedding vectors are of the same or similar ethnicities.

The term embedding, word embedding, name embedding, embedding vector, and word embedding vector may be interchangeably used in this disclosure. Embedding of words are derived using a vocabulary compression technique. For example, each word from a document or documents having K words in its entire vocabulary is mapped to an L-dimensional embedding vector. It involves a mathematical compression from a discrete K-dimensional space to a continuous L-dimensional vector space, where L is lower than K. Methods for generating this mapping include neural networks, probabilistic models, and explicit representation of the context in which words appear. An exemplary tool or model for generating embedding vectors from a learning document may be Word2vec, known in the art. Other word embedding tools are contemplated. Through word embedding, low-dimension continuous representation of words (or vocabulary) may be learned by capturing words' semantic and linguistic characteristics. Word2vec, particularly skip gram with negative sampling, i.e. SGNS, performs well under the assumption that similar words have similar context. In a nutshell, SGNS attempts to make words with more co-occurrences have similar embedding.

In block 402 of FIG. 4, a set of communication accounts with contact lists are collected. For example, Yahoo! email user accounts may be collected by Xobni. Each user name may contain an account holder name of the user and a contact list with contact names. The account holder names and contact names associated with the account holder names may be then extracted in block 404 and 406, respectively. In block 408, within each contact list, each contact name is assigned a score s measuring how frequent and/or recent the corresponding user sends emails to each contact. Various algorithms may be used to calculate the score. A chosen algorithm may take into consideration only the communication frequency or only the communication recency. Alternatively, the chosen algorithm may take both communication frequency and the communication recency into consideration and weigh them in various ways. The score may be in some linear relationship or nonlinear relationship with the communication frequency and/or recency quantified in predefined manners. Factors other than communication frequency and recency are contemplated. Higher score for a contact name may correspond to more frequent and/or recent communication with the contact by the account holder. In block 410, once scores for contact names are determined within a contact list of a communication account, the contact names of that account may then be sorted in a descending order of the score.

More specifically, assume the ith ordered contact list (associated with ith account) is $L_i = \{Name^1; Name^2; \ldots; Name^k\}$, where $k = \min(|C_i|, n)$, $C_i$ is the set of all contacts in the ith contact list, n is a predefined maximum number of contacts used for learning name embedding. Thus, the predefined number n may be used for truncation such that only n higher ranked names in an ordered contact list are kept when that contact list is excessively long. Further, each name, $Name^j$, may consist of multiple name parts, e.g. first name, middle name, last name etc. Thus $Name^j = (Name_1^j; Name_2^j, \ldots, Name_{-1}^j)$ and $Name_{-1}^j$ is always the last part of Name (last name or surname, for example). A word is formed by combining each name part and its position in the name because a same name part could serve as both given name and surname.

In block 412, a learning document to be used as a corpus for learning name embedding is generated. The learning document may include a plurality of segments, each segment being an account holder name words (first name word and surname word, for example) followed the contact name words sorted and optionally truncated as described above. Each name word is a word comprising a name part of a name and its position in that name, as described above. The order between segments, i.e., the order between different word groups each associated with an account holder name and the accompanying ordered contact names, may be random, may be ordered according to average scores of the names in each group, or may be ordered in any other suitable manner.

FIG. 5 illustrate an example learning document 508 generated from sorted contact lists 502, 504 and 506 containing name words. Communication accounts 1, 2, . . . , N are shown by 502, 504, and 506. Each of these accounts includes an account holder name and a list of contact names. Each name (either the account holder name, or contact list names) comprises name parts. As an example, a number of communications that each account holder have made to each of the contacts during a predetermined recent period of time (e.g., 1 month) is derived based on the communication log maintained for each communication account. These numbers are shown next to each contact name in 502, 504, and 506. After ordering the names in each contact list based on the frequency of recent communications and separating the names into name parts and attaching name part positions to these name parts to form words, a learnings document as a corpus for learning embedding is generated as shown in 508. The example learning document 508 contains sections each occupying a line of text. Each section corresponds to one communication account and contains the words for the name parts of the account holder and ordered words for the name parts of the contacts of the account holder.

The grouping and ordering of the name words above places account holder names and their frequent or recent contacts in close proximity or in each other's context for learning word embedding. Returning to FIG. 4 and in block 414, word embedding vectors for each word in the learning document may be generated. The generation of word embedding vectors may be based on Word2vec and SGNS, for example. The dimension of the word embedding vectors, d, may be predetermined. For example, the dimension of the word embedding vectors may be d=100. In essence, the large vocabulary space of the learning document may be compressed and reduced to d dimensions, exploring similarity between the words that can be learned through the contexts in the learning document. For example, names that often appear together or in close proximity may be considered similar under word embedding analysis and the embedding vectors derived for them may thus be similar in that the distances between them may be small. This similarity may be an indication that these names belong to persons of the same or similar ethnicities.

Thus, after block 414 of FIG. 4, each name part is represented by a d-dimension continuous-value embedding vector. Hereinafter, the term embedding, word embedding, embedding vector, word embedding vector are used interchangeably. In an exemplary implementation, a learning document (referred as Xobni contacts data) with 23,773,495 contact lists and 705,949,565 name parts from Xobni was generated. After ignoring name parts with less than 5 occurrences, embedding of 4,088,629 unique name parts were learned using Word2Vec and SGNS. It was noted that there are users who fill in random names when registering accounts. Thus there are noisy name parts in the dictionary of embedding. But it is still large enough to cover most of popular name parts from different ethnic groups. In this particular implementation, it was found through testing different parameter configurations that best performance is achieved by setting n=20, d=100, i.e., contact lists are truncated at 20 names, and the word embedding vectors are set at a dimension of 100.

Features that may be used for further establishment of a classifier of, e.g., ethnicity, based on names, may be developed using the word embedding vectors derived above. Specifically, since name embedding captures ethnicity signal well, they may be used as features and fed to most classification models. For example, let $Name_1^0$ and $Name_{-1}^0$ be the first names and surname of a user u. The first names and surnames of the contact names of user u are $\{Name_1^1, Name_1^2, \ldots Name_1^k\}$, and $\{Name_{-1}^1, Name_{-1}^2, \ldots Name_{-1}^k\}$, respectively. Let the embedding of a name part be represented by Ebd(name part). The feature vector f of the user may comprise four parts:

$$f_1 = Ebd(Name_1^0);$$

$$f_2 = Ebd(Name_{-1}^0);$$

$$f_3 = \frac{1}{k}\sum_{i=1}^{k} \omega_i Ebd(Name_1^i); \text{ and}$$

$$f_4 = \frac{1}{k}\sum_{i=1}^{k} \omega_i Ebd(Name_{-1}^i);$$

where $\omega_i$ is the weight assigned to contact $Name^i$.

Therefore, f, a concatenation of $f_1$, $f_2$, $f_3$, and $f_4$, is of 4×d dimensions. The exemplary features of a user name thus include the embedding of his/her first name, his/her surname, a weighted average of the embedding of the first names of his/her contacts, and a weighted average of the embedding of the surnames of his/her contacts. The weight $\omega_i$ may be determined in various ways. For example, $\omega_i$ may be constant for all contact names. Alternatively, $\omega_i$ may be a function of communication frequency and/or recency between the user and ith contact. Alternatively, feature f may include less than all of $f_1$, $f_2$, $f_3$, and $f_4$. For example, f may include only the last name features $f_2$ and $f_4$ that may be more correlated with ethnicity. In that case, feature f may be of 2×d dimensions rather than 4×d dimensions.

Once the suitable features are determined, an ethnicity classifier model may be developed based on machine learning algorithms, as shown by an exemplary flow chart 600 in FIG. 6. In block 602, account holder names labeled with ethnicities, as described above, are identified and the features of these account holder names may be obtained from the embedding. Together with the labeled ethnicity, each training data point to be input into a machine learning algorithm contains a 4×d dimension features and an ethnicity label. In block 604, the training data set containing features and labels are input into a machine learning algorithm for developing an ethnicity classifier.

For example, the classifier may be developed based on logistic regression. In one implementation, each ethnicity of the predefined set of ethnicities may be treated separated and a separate classifier may be learned from the features of the training data set for each specific ethnicity. For example, the set of ethnicities may be White, API, Hispanics, Others and each name in the training data set is labeled with one of these ethnicities. Separate classifiers each for White, API, Hispanics, and Others may be developed based on the training data set and logistic regression. Taken the modeling of a Hispanics classifier as an example, the ethnicity labels of the training set may be reprocessed with respect to Hispanics. Specifically, the labels may be binarized to zero or one depending on whether the names are labeled as Hispanics or not. The reprocessed Hispanics label and the embedding features described above may then be input into a logistic regression algorithm. The resulting Hispanics classifier may be capable predicting a probability that a person with an unlabeled name is of Hispanics ethnicity by using a set of embedding features of the unlabeled name. A threshold probability may be predefined such that the unlabeled name may be classified either as Hispanics or non-Hispanics. Similarly, White and API classifiers may also be separately developed. An unlabeled name may then be input into each of these classifiers for obtaining a predicted probability that the unlabeled name is of each of the corresponding ethnicity. The probabilities among the various ethnicities for the unlabeled name may be compared and the most probably ethnicity for the unlabeled name may be determined and the unlabeled name may be assigned that most probable ethnicity.

In one specific implementation of logistic regression for developing a classifier for one of the ethnicities, a training data set for a user set U with reprocessed label set Y may be used. Training data for each user u within the user set U comprises feature vector fu and reprocessed ethnicity label $y_u$. As described above, the ethnicity label $y_u$ may be a binary label with respect to the one of the ethnicities. The logistic regression may seek to maximize the conditional data likelihood:

$$P(w) = \prod_{u \in U} p(y_u | f^u, w) = \prod_{u \in U} g(f^u)^{y_u} (1 - g(f^u))^{1-y_u} \quad (1)$$

$$g(f^u) = \frac{1}{1 + e^{-w^T \cdot f^u}} \quad (2)$$

where $\omega^T$ is the model parameters to be learned. $\omega^T$ may be the output of the classifier model. For quantifying the likelihood that an unlabeled name belongs to this ethnicity, the vector dot product of $\omega^T$ and the feature vector of the unlabeled name may be calculated.

As an alternative to the set of classifiers based on logistic regression, a single classier of ethnicity may be developed based on, for example, a Random Forest Regression Algorithm (RFRA). The training data set for user set U may include the feature vectors for each user name and the ethnicity label. Random data from the training data set may be used for establish a large number of decision trees for ethnicity classification. The decision trees may be combined for predicting the ethnicity of an unlabeled name having a certain feature vector.

Thus, after ethnicity classifier or a set of separate classifiers are established in block 604 of FIG. 6, ethnicity of an unlabeled name may be predicted using these established classifiers. In one implementation, as shown by block 606 of FIG. 6, the embedding features of an unlabeled name may be obtained. In block 608, the unlabeled name may be classified into a most probable ethnicity using the developed ethnicity classifier or set of separate ethnicity classifiers, as described in detail above.

The performance and accuracy of the ethnicity classification of names above may be evaluated by using only a subset of the labeled data set for training and using the rest as a test data set. In one implementation, as shown in Table I above, the 1.2 million labeled names may be divided into training set and testing set that are independent, which means that any first names and last names that appear in the training set are excluded in the test set. For example, first name set for the labeled names may be divided into a 60% first name subset (referred as first name training subset) and a 40% first name subset (first name test subset). Similar division may be made to the last name (or surname) set. Then the labeled name set is crawled, and if a name in the labeled name set has both first name and last name in first name training subset and last name training subset, that name is included as a training instance. Similarly, if a name of the labeled name set has both first and last name in first name test subset and last name test subset, that that name is marked as a test instance. In such a way, the final training name subset and test name subset are made independent.

Table II shows test results using the test data set for classier models established using various parameters in logistic regression algorithm. The notation "Cntct" refers to constant weight $\omega_i$ in calculating contact embedding feature $f_3$, and $f_4$ above. The notation "WghtdCntct" refers to using normalized contact score s as weighted $\omega_i$ in calculating contact embedding feature $f_3$, and $f_4$ above. Baseline "First&LstName" modeling uses users' first and last name embedding (such as all of $f_1$, $f_2$, $f_3$, and $f_4$) in feature vector f while "LstName" modeling uses only last name embedding in feature vector f (such as $f_2$ and $f_4$ only). "mCntct" and "mWghtdCntct" use the embedding of up to m contacts in addition to that for first and last names, respectively.

Three different metrics known in the art may be used to measure the performance of the resulting classifiers: F1 score, AUC of average precision curve, and AUC of ROC curve. All these metrics may be in a range of [0, 1] and a larger metrics number indicate better performance of the classifiers. As shown in Table II: 3Cntct achieves best performance in most cases, especially when measuring with ROC, which is more robust to class bias; 3Cntct achieves almost perfect performance, with ROC above 0.996 for all 3 classifiers, likely due to a good feature set (i.e. name embedding) and high quality label set; Frst&LstName performs better than LstName and 3Cntct outperforms Frst&LstName, which is reasonable because machine learning algorithms normally perform better when given more useful signals; and LstName performs reasonably well, because last name likely contains most ethnicity signals.

Alternatively, test of the ethnicity classifier may be made using names labeled in other ways. For example, 1,919 Hispanic names and 2,599 Non-Hispanic names may be crawled from Wikipedia. Test dataset may be generated in following steps. First Wikipedia category page "Lists of American people by ethnic or national origin" is obtained and Americans who have origins from homo-ethnicity Hispanic countries, including Mexico, Colombia, Spain, Cuba and Argentina are chosen. These names are labeled as Hispanics. Similarly, names for Americans having origins in Taiwan, France, Germany, Indonesia and India are labeled as non-Hispanics. A Hispanics classifier model developed above based on logistic regression may thus be tested using the labeled names in Wikipedia™.

Ethnicity classification of a person's name, or any other classifications based on names that may be similarly developed using the principles disclosed above may be closely correlated with and may have significant influence on the cultural, social, economic, commercial, and other preferences of the person. Targeted information dissemination, such as individualized advertisement, social media posts, and news, may be automated based on such classifications.

In summary, the disclosure above describes exemplary implementations of method and apparatus for classifying names into a predefined set of classifications (such as ethnicity classifications) based on applying machine learning algorithms to information derived from electronic communication accounts (such as email accounts). For example, classification of a selected group of account holder names may be determined; contact lists of the selected group of account holders and manners in which contacts are used by the selected group of account holders for communication may be analyzed to generate a set of features (such as name embedding); correlation between names and features may be identified using machine learning algorithms; and the identified correlation may be used to classify names with unknown classification. The classification of a person's name may be correlated with economic, commercial, social and other preferences of the person. As such, effectiveness of automated and targeted information dissemination, such as targeted advertisement and targeted news, may be improved by such classification.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the

TABLE II

| Metrics | Ethnicity | 3Cntct | 3WghtdCntct | 1Cntct | Frst&LstName | LstName |
|---|---|---|---|---|---|---|
| F1 | White | 0.9770/0.0011 | 9.9683/0.0011 | 0.9732/0.0013 | 0.9676/0.0016 | 0.9599/0.0023 |
|  | API | 0.9747/0.0032 | 0.9715/0.0020 | 0.9774/0.0001 | 0.9664/0.0046 | 0.9577/0.0065 |
|  | Hispanics | 0.9766/0.0011 | 0.9662/0.0008 | 0.9683/0.0024 | 0.9570/0.0024 | 0.9455/0.0048 |
| AvePrec | White | 0.9958/0.0000 | 0.9930/0.0000 | 0.9946/0.0002 | 0.9902/0.0002 | 0.9859/0.0002 |
|  | API | 0.9955/0.0008 | 0.9944/0.0008 | 0.9960/0.0002 | 0.9926/0.0015 | 0.9903/0.0020 |
|  | Hisipanics | 0.9936/0.0005 | 0.9884/0.0010 | 0.9892/0.0005 | 0.9803/0.0011 | 0.9681/0.0022 |
| ROC | White | 0.9961/0.0001 | 0.9940/0.0003 | 0.9945/0.0005 | 0.9919/0.0004 | 0.9884/0.0005 |
|  | API | 0.9972/0.0002 | 0.9962/0.0002 | 0.9971/0.0000 | 0.9951/0.0005 | 0.9935/0.0008 |
|  | Hispanics | 0.9986/0.0000 | 0.9973/0.0000 | 0.9978/0.0002 | 0.9949/0.0003 | 0.9912/0.0006 | illustrations are merely representational and may not be drawn to scale. Certain proportions within the illustrations may be exaggerated, while other proportions may be minimized. Accordingly, the disclosure and the figures are to be regarded as illustrative rather than restrictive.

The invention claimed is:

1. A computer-implemented method comprising:
   extracting a first account holder name from a first electronic communication account;
   extracting a second account holder name from a second electronic communication account;
   extracting first contact names from a first contact list of the first electronic communication account;
   extracting second contact names from a second contact list of the second electronic communication account;
   sorting the first contact names in the first contact list to generate first sorted contact names;
   sorting the second contact names in the second contact list to generate second sorted contact names;
   creating, from the first sorted contact names and the second sorted contact names, a document comprising a plurality of words representing the first account holder name, the second account holder name, the first contact names and the second contact names;
   generating a word embedding of a defined number of dimensions from the document for one or more words of the plurality of words;
   identifying a first country corresponding to a first registration country for the first electronic communication account;
   identifying a second country corresponding to a second registration country for the second electronic communication account;
   determining that the first country is a homo-ethnicity country based on a census data;
   determining one or more popular account holder names associated with the first country;
   assigning one or more dominant ethnicities associated with the first country to the one or more popular account holder names;
   establishing a classifier model based on a machine learning algorithm, using, as training data, the one or more dominant ethnicities and one or more features of the first country derived from the word embedding; and
   classifying a name into a classification using the classifier model, at least some of the method performed using a computer processor.

2. The computer-implemented method of claim 1, comprising:
   transmitting a communication to one or more electronic communication accounts based on the classification of the name.

3. The computer-implemented method of claim 1, comprising:
   disseminating targeted information, comprising at least one of an advertisement, a social media post, or news, based on the classification of the name.

4. The computer-implemented method of claim 1, comprising:
   generating the training data based on one or more contacts lists of one or more electronic communication accounts.

5. The computer-implemented method of claim 1, comprising:
   generating the training data based on one or more communication logs of one or more electronic communication accounts.

6. The computer-implemented method of claim 5, comprising:
   processing the one or more communication logs to extract one or more manners in which one or more users communicate.

7. The computer-implemented method of claim 1, comprising:
   generating the training data based on one or more contacts lists of one or more electronic communication accounts and one or more communication logs of the one or more electronic communication accounts.

8. A computing device comprising:
   a computer processor; and
   memory comprising instructions that when executed by the computer processor perform operations comprising:
      extracting a first account holder name from a first electronic communication account;
      extracting a second account holder name from a second electronic communication account;
      extracting first contact names from a first contact list of the first electronic communication account;
      extracting second contact names from a second contact list of the second electronic communication account;
      sorting the first contact names in the first contact list to generate first sorted contact names;
      sorting the second contact names in the second contact list to generate second sorted contact names;
      creating, from the first sorted contact names and the second sorted contact names, a document comprising a plurality of words representing the first account holder name, the second account holder name, the first contact names and the second contact names;
      generating a word embedding of a defined number of dimensions from the document for one or more words of the plurality of words;
      identifying a first country corresponding to a first registration country for the first electronic communication account;
      identifying a second country corresponding to a second registration country for the second electronic communication account;
      determining that the first country is a homo-ethnicity country based on a census data;
      determining one or more popular account holder names associated with the first country;
      assigning one or more dominant ethnicities associated with the first country to the one or more popular account holder names;
      establishing a classifier model based on a machine learning algorithm, using, as training data, the one or more dominant ethnicities and one or more features of the first country derived from the word embedding; and
      classifying a name into a classification using the classifier model.

9. The computing device of claim 8, the operations comprising:
   transmitting a communication to one or more electronic communication accounts based on the classification of the name.

10. The computing device of claim 8, the operations comprising:
    disseminating targeted information, comprising at least one of an advertisement, a social media post, or news, based on the classification of the name.

11. The computing device of claim 8, the operations comprising:

generating the training data based on one or more contacts lists of one or more electronic communication accounts.

12. The computing device of claim 8, the operations comprising:
generating the training data based on one or more communication logs of one or more electronic communication accounts.

13. The computing device of claim 12, the operations comprising:
processing the one or more communication logs to extract one or more manners in which one or more users communicate.

14. The computing device of claim 8, the operations comprising:
generating the training data based on one or more contacts lists of one or more electronic communication accounts and one or more communication logs of the one or more electronic communication accounts.

15. Non-transitory storage comprising instructions that when executed perform operations comprising:
extracting a first account holder name from a first electronic communication account;
extracting a second account holder name from a second electronic communication account;
extracting first contact names from a first contact list of the first electronic communication account;
extracting second contact names from a second contact list of the second electronic communication account;
sorting the first contact names in the first contact list to generate first sorted contact names;
sorting the second contact names in the second contact list to generate second sorted contact names;
creating, from the first sorted contact names and the second sorted contact names, a document comprising a plurality of words representing the first account holder name, the second account holder name, the first contact names and the second contact names;
generating a word embedding of a defined number of dimensions from the document for one or more words of the plurality of words;
identifying a first country corresponding to a first registration country for the first electronic communication account;
identifying a second country corresponding to a second registration country for the second electronic communication account;
determining that the first country is a homo-ethnicity country based on a census data;
determining one or more popular account holder names associated with the first country;
assigning one or more dominant ethnicities associated with the first country to the one or more popular account holder names;
establishing a classifier model based on a machine learning algorithm, using, as training data, the one or more dominant ethnicities and one or more features of the first country derived from the word embedding; and
classifying a name into a classification using the classifier model.

16. The non-transitory storage of claim 15, comprising:
transmitting a communication to one or more electronic communication accounts based on the classification of the name.

17. The non-transitory storage of claim 15, comprising:
disseminating targeted information, comprising at least one of an advertisement, a social media post, or news, based on the classification of the name.

18. The non-transitory storage of claim 15, comprising:
generating the training data based on one or more contacts lists of one or more electronic communication accounts.

19. The non-transitory storage of claim 15, comprising:
generating the training data based on one or more communication logs of one or more electronic communication accounts.

20. The non-transitory storage of claim 19, comprising:
processing the one or more communication logs to extract one or more manners in which one or more users communicate.

* * * * *